United States Patent [19]

Takahashi

[11] Patent Number: 4,558,610
[45] Date of Patent: Dec. 17, 1985

[54] SHIFT CONTROL MECHANISM OF AN AUTOMOTIVE MANUAL TRANSMISSION

[75] Inventor: Kotei Takahashi, Yokohama, Japan

[73] Assignee: Nissan Motor Co., Ltd., Yokohama, Japan

[21] Appl. No.: 350,392

[22] Filed: Feb. 19, 1982

[30] Foreign Application Priority Data

Feb. 20, 1981 [JP] Japan .................................. 56-24765

[51] Int. Cl.⁴ .......................................... B60K 20/00
[52] U.S. Cl. ..................................... 74/473 R; 74/104
[58] Field of Search .............................. 74/473 R, 104

[56] References Cited

U.S. PATENT DOCUMENTS

| | | | |
|---|---|---|---|
| 3,915,027 | 10/1975 | Simmons et al. | 74/473 R |
| 3,916,718 | 11/1975 | Kelbel et al. | 74/471 R |
| 3,962,930 | 6/1976 | Frazee | 74/477 |
| 4,156,474 | 5/1979 | Aida | 74/473 R |
| 4,220,217 | 9/1980 | Kobayashi | 74/473 R |
| 4,277,983 | 7/1981 | Izumi et al. | 74/477 |
| 4,338,828 | 7/1982 | Ruhlman | 74/475 |

FOREIGN PATENT DOCUMENTS

| | | | |
|---|---|---|---|
| 48-19691 | 6/1973 | Japan . | |
| 55-57925 | 4/1980 | Japan . | |
| 5100466 | 7/1980 | Japan | 74/473 R |
| 0102725 | 8/1980 | Japan | 74/476 |
| 1183796 | 3/1970 | United Kingdom | 74/473 R |
| 1274334 | 5/1972 | United Kingdom . | |
| 2071237 | 9/1981 | United Kingdom | 74/473 R |

OTHER PUBLICATIONS

Vol. 4, No. 100, Patent Abstracts of Japan.

Primary Examiner—Lawrence J. Staab
Attorney, Agent, or Firm—Lowe, King, Price & Becker

[57] ABSTRACT

In an automotive manual transmission comprising a plurality of shift forks each having at its extension a recess, a plurality of pivotting levers pivotable about a common axis, a first end of each pivotting lever being received in the recess of the corresponding shift fork extension to form an articulated connection therebetween so that upon rotation of one pivotting lever about the common axis, the corresponding shift fork is operatively moved to establish a certain gear ratio of the transmission, and means engageable with a second end of each pivotting lever for selecting one of the pivotting levers and pivotally moving the selected pivotting lever about the common axis, there is provided a wear-resistant cap member which is slidably and movably put on the first end of each pivotting lever while being accommodated in the recess of the corresponding shift fork extension.

7 Claims, 11 Drawing Figures

SHIFT CONTROL MECHANISM OF AN AUTOMOTIVE MANUAL TRANSMISSION

BACKGROUND OF THE INVENTION

1. Field of the Invention

The present invention relates in general to a control mechanism of an automotive transmission, and more particularly to a shift control mechanism of a manual transmission which is particularly adaptable for use in a front-wheel-drive automotive vehicle having a transversely mounted engine.

2. Description of the Prior Art

In the transmission of the type mentioned above, the shift control mechanism is so arranged that the control rod actuated by the manual shift lever in the vehicle cabin extends perpendicular to the axis of the fork shaft on and along which shift forks slide axially. Thus, a so-called direction changing device is arranged between the control rod and the shift forks, which functions to convert the axial movement of the control rod to a sliding movement of selected one of the shift forks along the axis of the fork shaft. One of the direction changing devices is disclosed in Japanese laid-open Utility Model Application No. 48-19691, which comprises a plurality of L-shaped pivotting levers which are pivotally mounted on a common pivotting pin secured to the housing of the transmission, one end of each pivotting lever being pivotally jointed with an extension of the corresponding shift fork and the other end of each pivotting lever being selectively engageable with a head member secured to the control rod, so that upon a selecting operation of the control rod achieved by rotation thereof about its axis, the head member is brought into engagement with the other end of one of the pivotting levers, and upon a shifting operation of the rod achieved by the axial movement thereof after the selecting operation, the selected pivotting lever is rotated about the common pivotting pin in a given direction to move the corresponding shift fork along the fork shaft thereby to establish a certain gear ratio.

In usual direction changing devices including one shown by the above-mentioned Application, however, the pivotal connection or articulated connection between each pivotting lever and the extension of the corresponding shift fork has caused a considerable abrasion at the surface of the shift fork extension to which the pivotting lever is slidably and pivotally engaged. In fact, hitherto, the shift forks and thus the extensions are constructed of a light metal such as aluminum for the purpose of improving movability of them, while, the pivotting levers are constructed of a rigid strong metal, such as steel, for bearing the operation load applied thereto. In order to solve such abrasion problems, several measures have been proposed, one being to line the contacting surfaces of the shift fork extensions with a high wear resistant material, and another being to fix wear resistant pieces to the contacting surfaces to the extensions tightly, for example, by means of a dovetail joint method. However, these conventional measures fail to show practically satisified results because of their costly production method or poor productivity.

SUMMARY OF THE INVENTION

It is therefore an object of the present invention to provide an improved shift control mechanism of a manual transmission adapted for use with a transversely mounted engine, which is free of the above-mentioned drawbacks.

According to the present invention, there is provided a shift control mechanism of an automotive manual transmission comprising a plurality of shift forks each having at its extension a recess, a plurality of pivotting levers pivotable about a common axis, a first end of each pivotting lever being received in the recess of the corresponding shift fork extension in a manner to form an articulated connection therebetween so that upon rotation of one pivotting lever about the common axis, the corresponding shift fork is operatively shifted to establish a certain gear ratio of the transmission, and means engageable with a second end of each pivotting lever for selecting one of the pivotting levers and pivotally moving the selected pivotting lever about the common axis, which is characterized by a wear-resistant cap member which is slidably movably put on the first end of each pivotting lever while being accommodated in the recess of the corresponding shift fork extension.

DETAILED DESCRIPTION OF THE INVENTION

Figure 1:
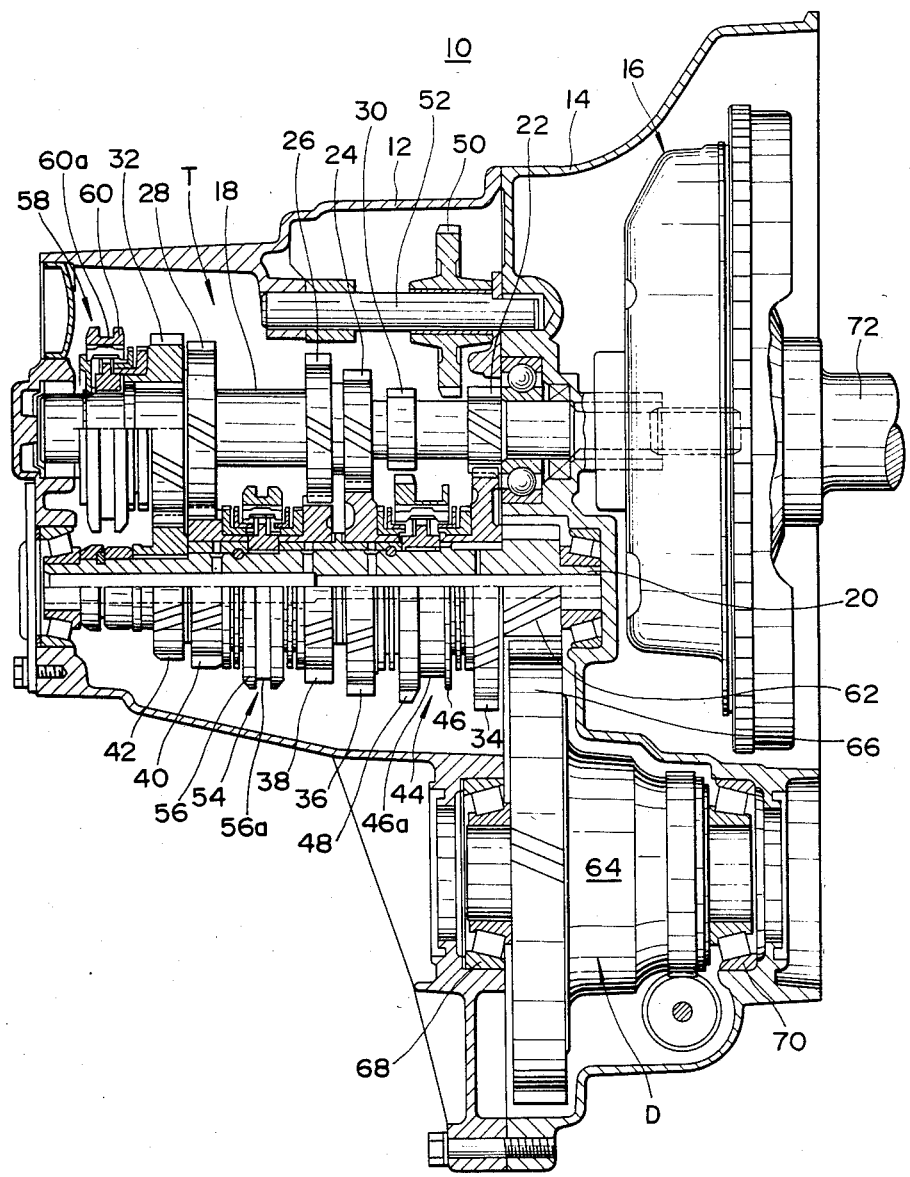
FIG. 1 is a longitudinally sectioned view of a manual transmission equipped with a shift control mechanism according to the present invention, some parts being shown dislocated for clarification of the drawing.
Figure 2:
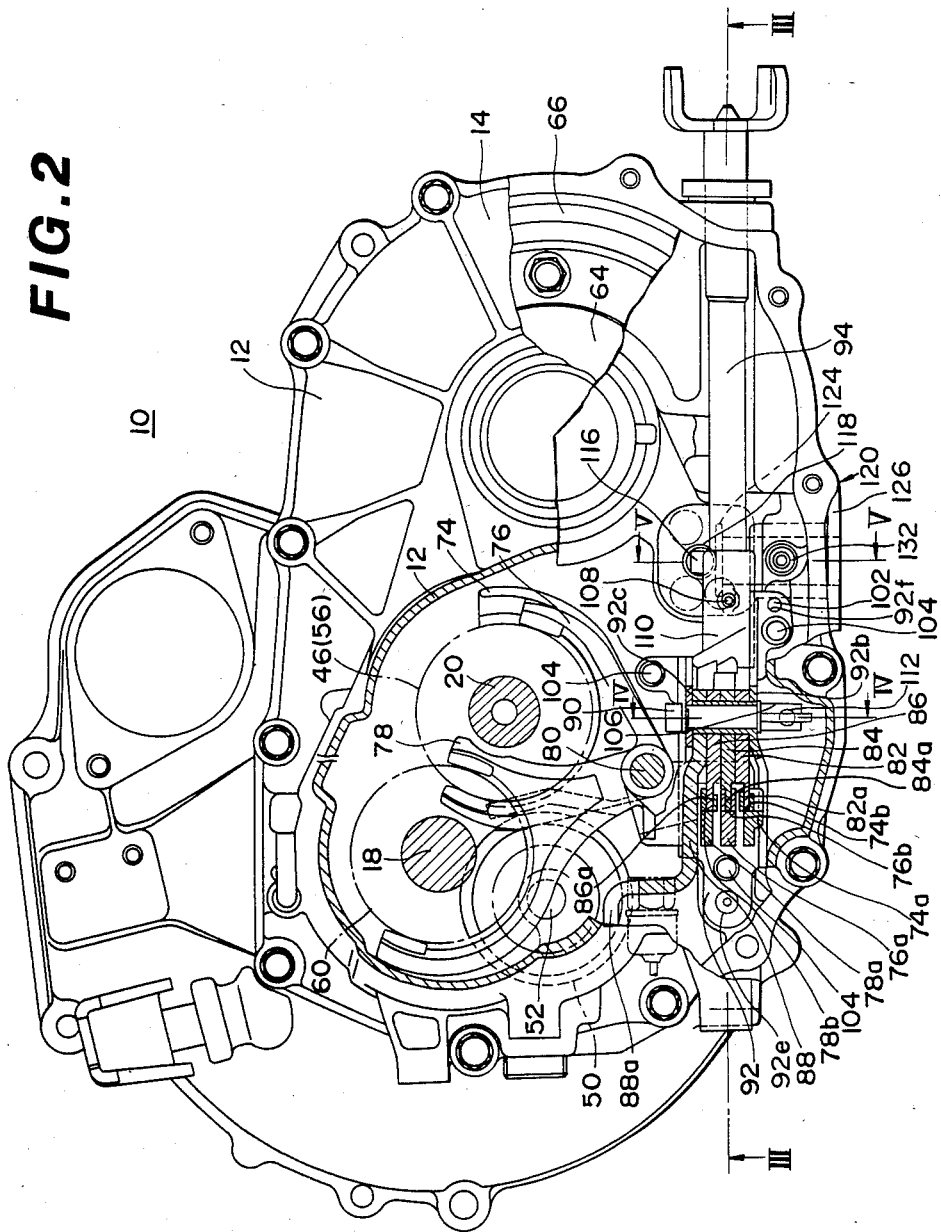
FIG. 2 is a tranversely sectioned view of the transmission, showing the shift control mechanism of the present invention.
Figure 3:
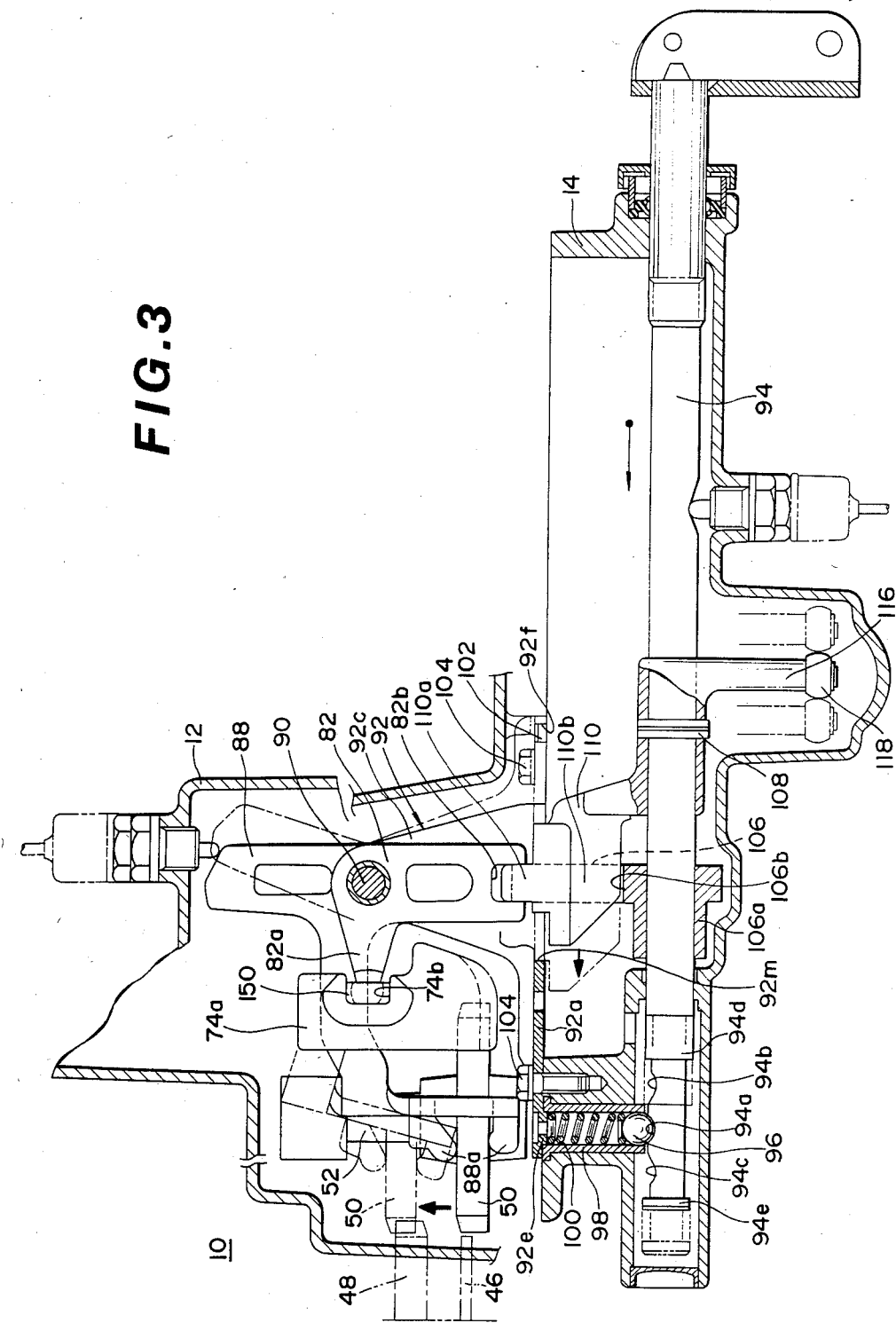
FIG. 3 is a sectional view taken along the line III—III of FIG. 2.

Referring to FIGS. 1 to 3, particularly FIG. 1, there is shown generally a transaxle assembly 10 adapted for use in a front-wheel-drive motor vehicle having a transversely mounted engine, in which assembly a shift control mechanism according to the present invention is incorporated. The transaxle assembly 10 is a single unit including a transmission T and a differential gear D as is seen from FIG. 1.

The transaxle assembly 10 comprises housings 12 and 14 which are united to mount therein gear trains of the transmission T as well as gears of the differential D. The housing 14 also acts as a housing for a clutch 16.

Within the housing 12, there are arranged in parallel an input shaft 18 and an output shaft 20 which are rotatable about the respective axes thereof relative to the housing. The input shaft 18 is adapted to receive torque from the engine through the clutch 16. Defined by or secured to the input shaft 18 are a first speed input gear 22, a second speed input gear 24, a third speed input gear 26, a fourth speed input gear 28 and a reverse input gear 30. A fifth speed input gear 32 is journalled on the input shaft 18. Journalled on the output shaft 20 are a first speed output gear 34, a second speed output gear 36, a third speed output gear 38 and a fourth speed output gear 40 which are constantly meshed with the first, second, third and fourth speed input gears 22, 24, 26 and 28, respectively. A fifth speed output gear 42 is splined to the output shaft 20 and constantly meshed with the fifth speed input gear 32.

A first-second synchronizing clutch mechanism 44 is slidably supported on the output shaft 20, which functions to smoothly connect either the first speed output gear 34 or the second speed output gear 36 to the output shaft 20 thereby to establish the first or second forward gear ratio. A coupling sleeve 46 of the mechanism 44 is formed at its periphery with a reverse idler gear 48 which is meshingly engageable with the reverse input gear 39 through a reverse idler gear 50 (which is shown dislocated in FIG. 1 for clarification of the drawing). The reverse idler gear 50 is rotatably and axially slidably mounted on a stationary shaft 52 which is parallel to the input and output shafts 18 and 20.

A similar third-fourth synchronizing clutch mechanism 54 is slidably supported on the output shaft 20, which functions to smoothly connect either the third speed output gear 38 or the fourth speed output gear 40 to the output shaft 20 thereby to establish the third or fourth forward gear ratio. Designated by numeral 56 is a coupling sleeve of the mechanism 54 which is shiftable rightward and leftward in FIG. 1.

A fifth synchronizing clutch mechanism 58 is slidably supported on the input shaft 18 for smoothly connecting the fifth speed input gear 32 to the input shaft 18 thereby to establish the fifth forward gear ratio. In particular, when a coupling sleeve 60 of this mechanism 58 is shifted rightward in FIG. 1, the fifth speed input gear 32 meshing with the fifth speed output gear 42 becomes into driving connection with the input shaft 18.

A drive pinion 62 is defined by or secured to the output shaft 20. The drive pinion 62 meshes with a ring gear 66 secured to a casing 64 of the differential gear D thereby to constitute a final drive mechanism. The differential gear casing 64 is rotatably supported at its axial both ends by the housings 12 and 14 through thrust bearings 68 and 70 which are mounted in the housings 12 and 14, respectively. Although not shown in the drawing (FIG. 1), a pair of road wheel driving shafts are inserted at their inside ends into the casing 64 from the axial ends of the casing and respectively engaged with side gears (not shown) of the differential gear D.

In the above-described construction, the engine output which is transmitted from an engine crank shaft 72 to the input shaft 18 through the clutch 16 rotates the first, second, third and fourth speed output gears 34, 36, 38 and 40 through the first, second, third and fourth speed input gears 22, 24, 26 and 28. However, as far as the coupling sleeves 46, 56 and 60 and the reverse idler gear 50 take the respective rest positions as shown in FIG. 1, the engine power is not transmitted to the output shaft 20 thereby keeping the transmission T in a neutral condition.

When the coupling sleeve 46 is shifted rightward in FIG. 1, the first speed output gear 34 meshing with the first speed input gear 22 becomes into driving connection with the output shaft 20, so that the engine power is transmitted to the driving wheels (not shown) through the first speed input gear 22, the first speed output gear 34, the drive pinion 62, the ring gear 66 and the differential gear D thereby to establish a first forward gear ratio. Similar to this, when the coupling sleeve 46 is shifted lefward, a second forward gear ratio is established.

When the coupling sleeve 56 is shifted rightward in FIG. 1, the third speed output gear 38 meshing with the third speed input gear 26 becomes into driving connection with the output shaft 20 thereby to establish a third forward gear ratio, while, when the coupling sleeve 56 is shifted leftward, the fourth speed output gear 40 meshing with the fourth speed input gear 28 becomes into driving connection with the output shaft 20 thereby to establish a fourth forward gear ratio.

When the coupling sleeve 60 is shifted rightward in FIG. 1, the fifth speed input gear 32 meshing with the fifth speed output gear 42 becomes into driving connection with the input shaft 18 to be rotatable therewith, so that the engine power is transmitted to the driving wheels through the fifth speed input gear 32, the fifth speed output gear 42 splined to the output shaft 20, the drive pinion 62, the ring gear 66 and the differential gear D thereby to establish a fifth forward gear ratio.

When the reverse idler gear 50 is shifted leftward in FIG. 1 to engage with both the reverse input gear 30 and the reverse output gear 48, the engine power is transmitted to the driving wheels through the reverse input gear 30, the reverse idler gear 50, the reverse output gear 48, the drive pinion 62, the ring gear 66 and the differential gear D thereby to establish a reverse condition.

The shift control mechanism of the present invention, which conducts the above-mentioned operation, has a construction which will be described hereinnext.

Figure 7:
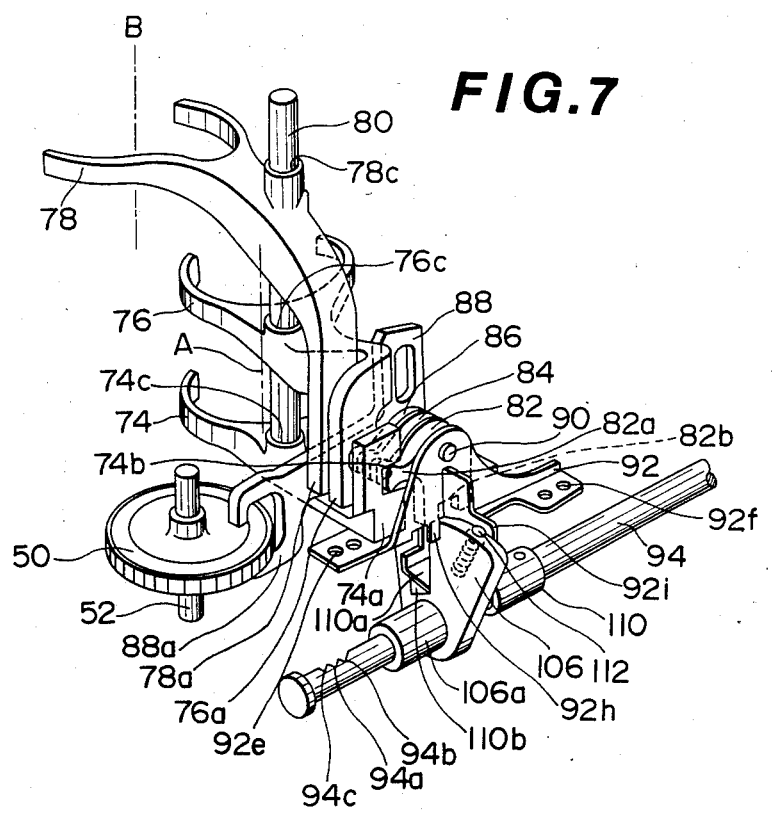
FIG. 7 is a perspective view of the shift control mechanism incorporating the shift fork assembly.

As is best seen from FIG. 2, a common shift fork shaft 80 is arranged in the housing in a manner to be parallel with the input and output shafts 18 and 20. Three shift forks 74, 76 and 78 constructed of light metal, for example, aluminium are slidably mounted at their hub sections on the common fork shaft 80 in this order, as is best seen from FIG. 7. The shift forks 74, 76 and 78 are operatively engaged with the annular grooves 46a, 56a and 60a (see FIG. 1) of the coupling sleeves 46, 56 and 60, respectively, for shifting these coupling sleeves rightward or leftward in FIG. 1. As is best seen from FIG. 7, the shift forks 74, 76 and 78 are respectively formed with extensions 74a, 76c, 78a. The extensions 76a and 78a extend along the fork shaft 80 in the same direction, while, the extension 74a extends to straddle the leading ends of the extensions 76a and 78a. As will be understood from FIGS. 2 and 7, the extension 76a is placed between the extension 74a and the extension 78a. For the reason which will become clear hereinafter, the extensions 74a, 76a and 78a are respectively formed at their leading ends with recesses 74b, 76b and 78b which face toward the same direction, that is, toward a motion transmitting mechanism. As is described hereinnext, the motion transmitting mechanism functions to transmit the axial motion of a manually operated control rod 94 to selected one of the shift forks 74, 76 and 78 thereby shifting the corresponding coupling sleeve 46, 56 or 60 in such a manner as is mentioned hereinabove.

The motion transmitting mechanism comprises first, second, third and fourth pivotting levers 82, 84, 86 and 88 which have substantial equal thickness and are pivotally mounted on a common pin 90 in this order so as to be pivotal about the axis of the pin 90. In the present embodiment, the first, second and third pivotting levers 82, 84 and 86 are identical in shape. As will become clear as the description proceeds, the pin 90 is arranged normal to the axis of the common shift fork shaft 80. The first, second and third pivotting levers 82, 84 and 86 are respectively formed with first arm portions 82a, 84a and 86a which are respectively and jointly received in the afore-mentioned recesses 74b, 76b and 78b of the shift fork extensions 74a, 76a and 78a to form therewith respective articulated connections. The leading ends 82c, 84c and 86c of the arm portions 82a, 84a and 86a are equipped with caps 150 (see FIGS. 3 and 8) of sintered alloy or suitable plastics for effecting abrasion protection.

The articulated connection between each shift fork extension 74a, 76a or 78a and the corresponding arm portion 82a, 84a or 86a will be described in detail hereinafter because the connection is directly concerned with the measure of the present invention.

As is seen from FIG. 3, the fourth pivotting lever 88 has an elongate extension 88a which is bifurcated stradding the reverse idler gear 50.

Figure 6:
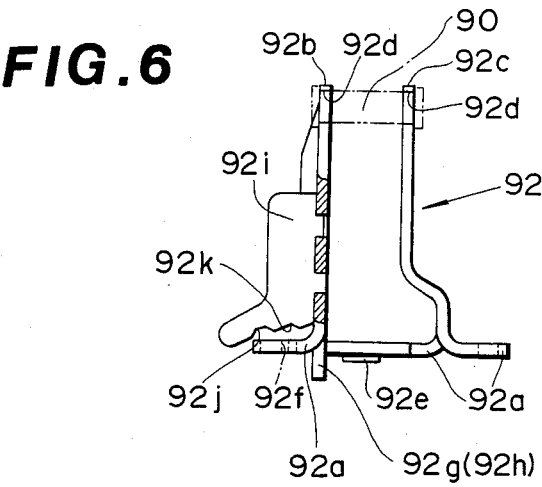
FIG. 6 is a partially broken front view of a bracket for mounting pivotting levers thereon.

The unit consisting of the first, second, third and fourth pivotting levers 82, 84, 86 and 88 and the common pin 90 is housed in a supporting member or generally U-shaped bracket 92 which is removably connected to the housing 14. As is understood from FIGS. 2 and 6, the common pin 90 passes through aligned holes 92d respectively formed in spaced side walls 92b and 92c of the bracket 92. The bottom wall 92a of the bracket 92 is formed at spaced sections thereof with three holes (no numerals) through which after-mentioned three bolts 104 are respectively passed. Further, the bottom wall 92a of the bracket 92 is formed at its outer surface with a circular projection 92e, and a positioning hole 92f. As will be understood from FIG. 2, the bracket 92 is secured to the housing 14 by the three bolts 104 passing through the three holes of the bracket bottom wall 92a and is arranged so that the first, second, third and fourth pivotting levers 82, 84, 86 and 88 are pivotable about the common pin 90 along respective planes parallel to the axis of the common fork shaft 80. As is seen from FIGS. 2 and 3, securing the bracket 92 to the housing 14 is so made that the circular projection 92e of the bottom wall 92a is put in one open end of a later-mentioned sleeve 98 and the positioning hole 92f of the bottom wall 92a puts therein a positioning pin 102 secured to the housing 14.

As is seen from FIGS. 2 and 3, a control rod 94 is arranged in the housing 14 in such an arrangement that the axis thereof is normal to the axis of the common fork shaft 80. The control rod 94 is rotatable about the axis thereof and slidable along the axis thereof. One end of the control rod 94 is projected outwardly from the housing 14 and connected through a suitable linkage to a conventional manual shift lever (not shown) located in a vehicle cabin. It is to be noted that the selecting operation of the manual shift lever induces rotation of the control rod 94 about the axis thereof and the shifting operation of the manual shift lever induces sliding movement of the control rod 94 along the axis thereof. As is seen from FIG. 3, the control rod 94 is formed at its inwardly leading end portion with three axially spaced notches 94a, 94b and 94c. A detent ball 96 is slidably received in the afore-mentioned sleeve 98 which is tightly received in a bore (no numeral) formed in the housing 14. A spring 100 is put in the sleeve 98 to bias the detent ball 96 toward the control rod 94. With the detent ball 96 engaged in one of the notches 94a, 94b and 94c, the control rod 94 is restrained in one of its longitudinal positions.

As is understood from FIG. 3, the pivotting levers 82, 84, 86 and 88 are of a bell crank type, and they have at the leading ends of second arm portions thereof respective recesses 82b, 84b, 86b and 88b, the recesses being aligned when all the pivotting levers 82, 84, 86 and 88 are in their neutral or rest positions.

An interlock is provided to ensure that only one pivotting lever 82, 84, 86 and 88 is moved at any given time. A generally sectorial interlock plate 106 is rotatably disposed at its hub section 106a on the control rod 94 with its arcuate free end section slidably received in the aligned recesses 82b, 84b, 86b and 88b of the pivotting levers. As will be understood from FIGS. 4, 5 and 6, the sectorial section of the interlock plate 106 is put between two lug portions 92g and 92h (see FIG. 6) of the bracket 92 so as to restrain the axial movement of the interlock plate 106 along the control rod 94. As is seen from FIG. 4, the interlock plate 106 is formed with a stepped recess 106b which leads to the arcuate free end section. The width of the mouth portion of the recess 106b is equal to or less than the thickness of the major portion of each pivotting lever. As is seen from FIG. 4, a blind hole 106c is formed in the interlock plate 106, which extends toward the hub section 106a.

Figure 4:
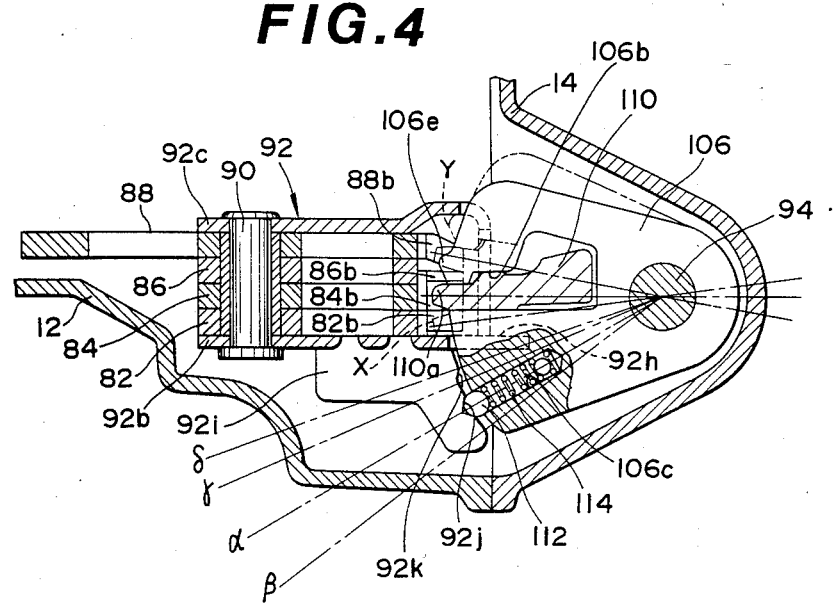
FIG. 4 is a sectional view taken along the line IV—IV of FIG. 2.

As is seen from FIG. 3, a control head member 110 is secured at its hub section to the control rod 94 by means of a connecting pin 108 to be movable therewith. The control head member 110 has a shank portion 110b which extends along the control rod 94 leaving a space therebetween. The shank portion 110b is slidably received in the afore-mentioned stepped recess 106b of the interlock plate 106. Thus, it will be appreciated that the rotation of the control head member 110 with the control rod 94 about the axis of the rod 94 induces a simultaneous rotation of the interlock plate 106, but, the axial movement of the control head member 110 with the control rod 94 does not induce the axial movement of the interlock plate 106. The shank portion 110b of the control head member 110 is formed with a head proper 110a which projects radially outwardly but slightly from the mouth of the stepped recess 106b of the interlock plate 106 so as to be received in one of the afore-mentioned recesses 82b, 84b, 86b and 88b of the pivotting levers 82, 84, 86 and 88. As is seen from FIG. 4, a detent ball 112 is slidably received in the blind hole 106c of the interlock plate 106. A spring 114 is put in the hole 106c to bias the ball 112 toward a notched plate 92i secured to the bracket 92 in a manner as is depicted by FIG. 4. The arrangement of the notched plate 92i relative to the bracket 92 may be understood from FIGS. 4 and 6. As is seen from FIGS. 4 and 6, the notched plate 92i is formed with a notch 92j and a step 92k with which the detent ball 112 is engageable. With the detent ball 112 engaged in the notch, the interlock plate 106 is restrained in a predetermined angular position. With this arrangement, a so-called select detent mechanism is provided, which gives the driver a detent feeling when he or she carries out the selecting operation.

As is seen in FIG. 4, the interlock plate 106 is formed, at the arcuate free end section near the mouth of the recess 106b, with a projection 106e which serves to limit rotation of the interlock plate 106 about the control rod 94 as will become clear hereinafter.

As is seen from FIG. 3, the control head member 110 is formed, at a side opposite to the shank portion 110b, with an arm 116 of which leading end is equipped with a roller 118 which are parts of a next-mentioned select return mechanism which functions to impose the shift lever operator (driver) a slightly greater effort to move the shift lever when he or she selects the fifth forward speed position or the reverse position. As is seen from FIG. 5, the roller 118 is associated with a biasing unit 120. The unit 120 comprises a holder 122 secured to the housing 14. A piston 124 is slidably received in the holder 122 and a spring 126 is set in the holder 122 to bias the piston 124 to abut against the roller 118. Designated by numeral 128 is a stopper pin which is secured to the holder 122 and projected into an axially extending recess 124c of the piston 124 for limiting the movement of the piston 124. The piston 124 is formed at its cylindrical outer side with an axially extending recess 124a which opens to a hole 122a formed in the holder 122. A detent ball 130 is slidably received in the hole 122a in a manner to be partially projected into the recess 124a. The ball 130 is biased toward the recess 124a by means of a spring 134 and another ball 136 which are received in a hole 14a defined by the housing 14, the hole 14a being plugged with a bolt 132.

In the following, operation will be described.

In order to facilitate the description, it will be commenced with respect to a condition wherein the control rod 94 is in a neutral position with respect to both the selecting (rotating) and shifting (sliding) movements, as is shown by FIGS. 2 to 5. In this condition, the detent ball 112 (see FIG. 4) carried by the interlock plate 106 is engaged with the notch 92j of the plate 92i to restrain the control rod 94 in an angular settled position, and the arm 116 (see FIG. 5) of the select return mechanism takes a position indicated by solid line wherein the roller 118 engages the piston 124 which takes its uppermost position. Further, in this condition, the head proper 110a of the control head member 110 is engaged with the recess 84b of the second pivotting lever 84, and as is seen from FIG. 3, the detent ball 96 is engaged with the center notch 94a of the control rod 94 to restrain the control rod 94 in a longitudinally settled position. Furthermore, in this condition, the coupling sleeves 46, 56 and 60 and the reverse idler gear 50 take the respective positions as shown by FIG. 1, so that the engine power is not transmitted to the differential gear D thereby holding the vehicle in a halt.

Figure 5:
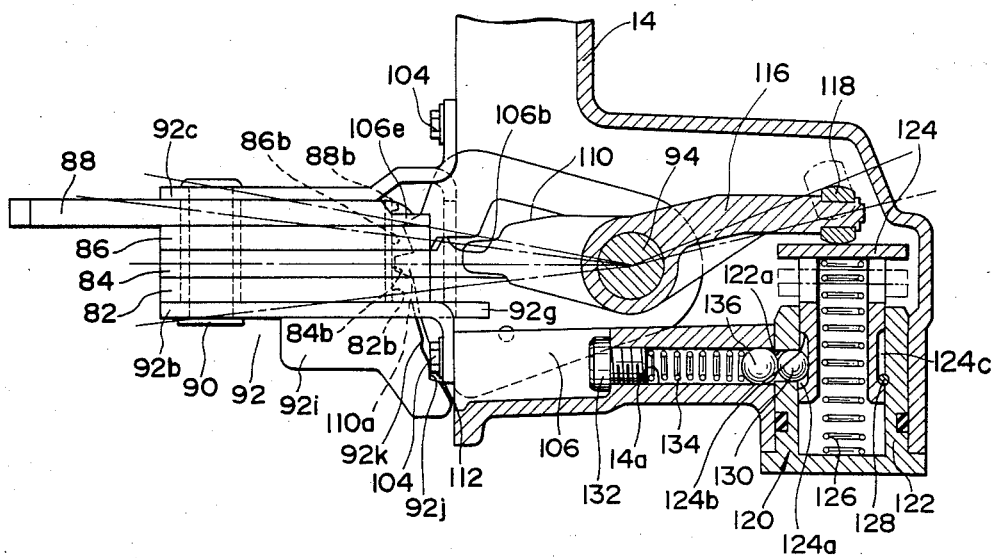
FIG. 5 is a sectional view taken along the line V—V of FIG. 2.

When now the control rod 94 is rotated about its axis in a counterclockwise direction in FIGS. 4 and 5, the control head member 110 rotated together with the rod 94 brings about a counterclockwise rotation of the interlock plate 106 moving detent ball 112 from a position on the line α (see FIG. 4) to a position on the line β. During this operation, a detent feeling is given because the detent ball 112 is pushed against the biasing force of the spring 114, and when the head proper 110a of the control head member 110 comes to a position indicated by broken line X in FIG. 4 and contacts a portion of the bracket 92, the operator (driver) can recognize that the control rod 94 has come to a temporary position for the first or second forward gear ratio, in which position the head proper 110a is received in the recess 82b of the first pivotting lever 82. When then the control rod 94 is axially moved in the rightward direction in FIGS. 2 and 3, the first pivotting lever 82 is rotated about the pin 90 in a counterclockwise direction in FIG. 3 thereby shifting through the shift fork 74 the coupling sleeve 46 in the rightward direction in FIG. 1. Thus, as has been mentioned hereinafore, the first forward gear ratio is established. While, when the control rod 94 in the temporary position is axially moved in the leftward direction in FIGS. 2 and 3, the lever 82 is rotated in a clockwise direction in FIG. 3 thereby shifting the coupling sleeve 46 in the leftward direction in FIG. 1. Thus, the second forward gear ratio is established.

During the above-mentioned operation, the detent ball 96 (see FIG. 3) is forced to move from the center notch 94a to the notch 94c or the notch 94b compressing the spring 100. Thus, a detent feeling is given.

When the control rod 94 in the above-mentioned neutral position is axially moved in the rightward direction in FIGS. 2 and 3, the second pivotting lever 84 is rotated about the pin 90 in a counterclockwise direction in FIG. 3 thereby shifting, through the shift fork 76, the coupling sleeve 56 in the rightward direction in FIG. 1. Thus, the third forward gear ratio is established as has been described hereinabove. When the control rod 94 in the neutral position is axially moved in the leftward direction in FIGS. 2 and 3, the second pivotting lever 84 is rotated in a clockwise direction in FIG. 3 thereby shifting the coupling sleeve 56 in the leftward direction in FIG. 1. Thus, the fourth forward gear ratio is established.

During this shifting operation, the detent feeling is also given by the spring-biased detent ball 96 similar to the case of the above-mentioned operation to the first or second forward gear ratio.

When the control rod 94 in the neutral position is rotated about the axis thereof in a clockwise direction in FIGS. 4 and 5, the control head member 110 rotated together with the rod 94 brings about a clockwise rotation of the interlock plate 106 moving the detent ball 112 from the position on the line α (see FIG. 4) to a position on the line γ. At this time, a detent feeling is given because the detent ball 112 is pushed against the biasing force of the spring 114 and is brought into contact with the step 92k of the notched plate 92i. During this operation, the arm 116 (see FIG. 5) extending from the control head member 110 is rotated about the axis of the control rod 94 in a clockwise direction in FIG. 5 pushing via the roller 118 the piston 124 against the force of the spring 126 into a position wherein one end 124b of the groove 124a of the piston 124 contacts the detent ball 130. This operation also gives a detent feeling. When the detent feeling is given, the operator (driver) can recognize that the head proper 110a of the control head member 110 has come to a temporary position where the head proper 110a is received in the recess 86b of the third pivotting lever 86. When, then, the control rod 94 is axially moved in the rightward direction in FIGS. 2 and 3, the third pivotting lever 86 is rotated about the pin 90 in a counterclockwise direction in FIG. 3 thereby moving, through the shift fork 78, the coupling sleeve 60 in the rightward direction in FIG. 1. Thus, the fifth forward gear ratio is established.

During this shifting operation, a detent feeling is given by a fact that the detent ball 96 is forced to move from the notch 94a to the notch 94c against the biasing force of the spring 100.

When the control rod 94 in the neutral position is rotated by a great degree about the axis thereof in a clockwise direction in FIGS. 4 and 5 exceeding the temporary position for the fifth forward gear ratio, the detent ball 112 carried by the interlock plate 106 is moved from the position on the line α to a position on the line δ riding over the step 92k. During this operation, the arm 116 (see FIG. 5) of the control head member 110 is greatly rotated about the axis of the control rod 94 in a clockwise direction in FIG. 5 pushing via the roller 118 the piston 124 against the force of the spring 126 by a degree to cause the detent ball 130 to ride over the end 124b of the recess 124a. With the detent ball 130 riding over the recess 124a, a detent feeling is given so that the operator (driver) can recognize that the head proper 110a of the control head member 110 has passed the temporary position for the fifth forward gear ratio. When the control rod 94 is still further rotated in the same direction, the projection 106e of the interlock plate 106 comes to a position indicated by a phantom line Y in FIG. 4 and finally contacts a portion of the bracket 92 so that the operator (driver) can recognize that the head proper 110a of the control head member 110 has come to a temporary position for the reverse gear ratio. In this condition, the head proper 110a of the control head member 110 is received in the recess 88b of the fourth pivoting lever 88. Thus, when then the control rod 94 is axially moved in the leftward direction in FIGS. 2 and 3, the fourth pivoting lever 88 is rotated about the pin 90 in a clockwise direction in FIG. 3, thereby moving the reverse idler gear 50 from the position indicated by solid line to the position indicated by phantom line. That is, the reverse idler gear 50 is shifted leftward in FIG. 1 to engage with both the reverse input gear 30 and the reverse output gear 48 to establish the reverse condition.

During this shifting operation, a detent feeling is given by a fact that the detent ball 96 (see FIG. 3) is forced to move from the notch 94a to the notch 94b against the biasing force of the spring 100.

Even when the operator (driver) intends to carry out the shifting operation with the control rod 94 taking an angular position other than the above-mentioned predetermined temporary positions, the shifting is suppressed because in such a condition the stepped recess 106b of the interlock plate 106 fails to align with any of the recesses 82b, 84b, 86b and 88b of the first, second, third and fourth pivoting levers 82, 84, 86 and 88 thereby blocking the movement of these levers 82, 84, 86 and 88 about the pin 90.

The axial moving distance of the control rod 94 is adjusted by, as is seen from FIG. 3, abutting a shoulder portion 94d of the rod 94 against the downwardly projected portion of the sleeve 98, abutting the control head member 110 against an edge 92m of the bracket bottom wall 92a, and abutting a flanged end 94e of the rod 94 against the projected portion of the sleeve 98. With this, a so-called shift stopper is provided.

In the following, the manner by which the articulated connection between each shift fork extension 74a, 76a or 78a and the corresponding arm portion 82a, 84a or 86a is established will be described in detail with reference to FIGS. 8 to 11.

Figure 8:
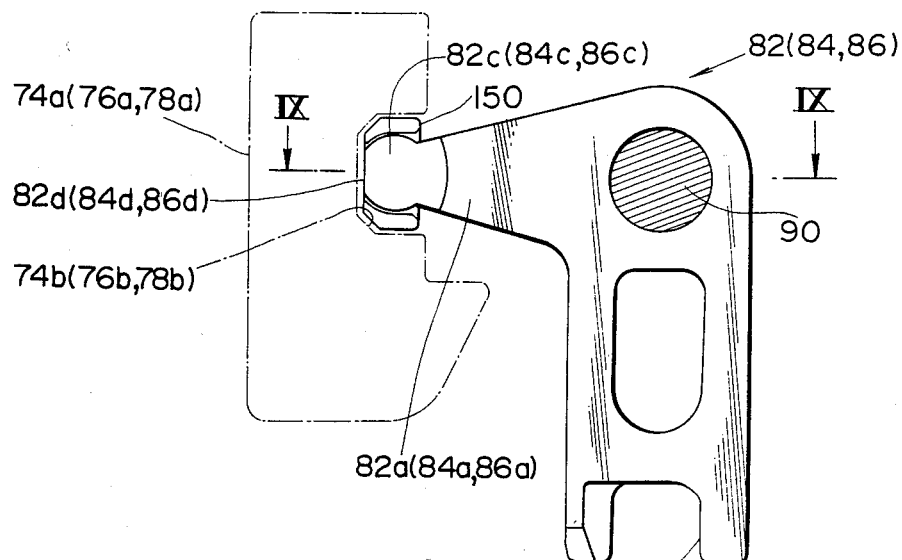
FIG. 8 is an enlarged front view of a pivotting lever of a direction changing device employed in the shift control mechanism of the present invention.
Figure 9:
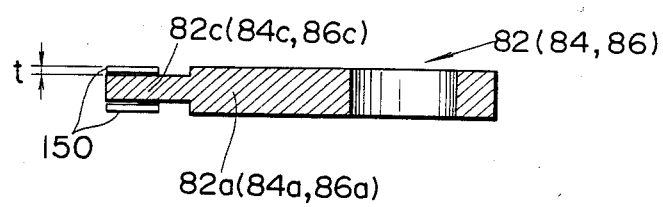
FIG. 9 is a sectional view taken along the line IX—IX of FIG. 8.
Figure 10:
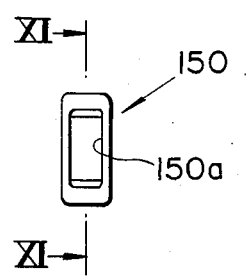
FIG. 10 is an enlarged side view of a cap employed in the shift control mechanism of the present invention.
Figure 11:
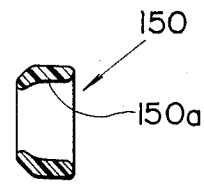
FIG. 11 is a sectional view taken along the line X1—X1 of FIG. 10.

As is described hereinabefore, the shift forks 74, 76 and 78 are constructed of, for example, aluminium, thereby causing the recesses 74b, 76b and 78b to be bounded by aluminium surfaces. Referring to FIGS. 8 and 9, each of the pivotting levers 82, 84 and 86 is constructed of a flat metal plate, such as a steel plate, and the leading end 82c, 84c or 86c of each lever 82, 84 or 86 is formed into a semicircular head having a flat top 82d, 84d or 86d. As is seen from FIG. 9, the thickness of the semicircular head portion 82c, 84c or 86c of each lever is somewhat smaller than that of the major portion thereby by taking the thickness "t" of the cap 150 into consideration. Each cap 150 is constructed of a high wear-resistant material, such as sintered alloy and wear-resistant plastics, for example, nylon. The cap 150 has a hole 150a the configuration of which matches with that of the head portion 82c, 84, or 86c so that upon coupling, smooth pivotal movement is given therebetween. The exterior configuration of the cap 150 matches with the recess 74b, 76b or 78b formed in the extension 74a, 76a or 78a of the shift fork 74, 76 or 78. As is best seen from FIG. 8, the articulated connection between the recess 74b, 76b or 78b of each shift fork extension 74a, 76a or 78a and the corresponding head portion 82c, 84c or 86c of the pivotting lever 82, 84 or 86 is made with an interposal of the cap 150 therebetween. Upon assemblage, the cap 150 is simply placed or put on the corresponding head portion of the lever 82, 84 or 86, and then, the head portion along with the cap is slidably inserted into the recess of the shift fork extension.

As is described hereinbefore, when the pivotting lever 82, 84 or 86 is rotated about the pin 90 in a given direction in response to the axial movement of the control rod, the shift fork 74, 76 or 78 is moved along the fork shaft 80 in a given direction to establish a certain gear ratio. During this operation, pivotal movements of the head portion 82c, 84c or 86c of the lever take place relative to the cap which is carried by the shift fork extension 74a, 76a or 78a. However, since the cap 150 is constructed of a wear-resistant material, the frictional engagement between the head portion 82c, 84c and or 86c of the pivotting lever 82, 84 or 86 and the cap 150 does not cause a considerable abrasion of the cap 150. Further, even under operation, the movement of the cap 150 relative to the surface by which the recess 74b, 76b or 78b is bounded is substantially zero or negligible, the surface of the recess 74b, 76b or 78b does not wear down. Thus, the articulated connection between the shift fork extension and the corresponding pivotting lever in the present invention lasts longer without trouble as compared with the conventional connection as mentioned hereinbefore.

What is claimed is:

1. A shift control mechanism of an automative manual transmission comprising a plurality of shift forks each having a recess formed within an extension thereof, a plurality of pivoting levers spaced closely adjacent each other and pivotable about a common axis, a first end of each pivoting lever being received in the recess of the associated shift fork extension so as to establish an articulated connection therebetween so that upon rotation of one pivoting lever about the common axis, the corresponding shift fork shifts to establish a certain transmission gear ratio; means selectively engageable with a second end of each pivoting lever for pivotally moving the selected pivoting lever about the common axis; and further including a wear-resistant cap member mounted on said first end of each pivoting lever so as to be slidably movable relative to said first end to reduce friction therebetween, said cap member mounted on said first end being received in said recess of the corresponding shift fork extension so that said cap is slightly moveable relative to surfaces of said recess to reduce friction therebetween.

2. A shift control mechanism as claimed in claim 1, wherein said cap member includes a hole comforming with the exterior surface of said first end of each pivoting lever, said cap member having an exterior configuration corresponding which the configuration of the recess of each shift fork extension.

3. A shift control mechanism as claimed in claim 2, wherein said first end is generally circular in shape.

4. A shift control mechanism as claimed in claim 1, wherein said cap member is constructed of a sintered alloy.

5. A shift control mechanism as claimed in claim 1, wherein said cap is constructed of wear resistant plastics.

6. The mechanism of claim 2, wherein said first end of each pivoting lever includes a pair of arcuate surfaces connected by a flat surface portion defining the extreme end of said first end, said flat surface portion being coplanar with an end of said cap received in the recess, said first end further including a pair of flat surfaces formed generally parallel with each other and extending between said arcuate surfaces to define the thickness of the first end.

7. A shift control mechanism of an automotive manual transmission comprising a plurality of shift forks each having a recess formed within an extension thereof, a plurality of pivoting levers spaced closely adjacent each other and pivotable about a common axis, a first end of each pivoting lever being received in the recess of the associated shift fork extension so as to establish an articulated connection therebetween so that upon rotation of one pivoting lever about the common axis, the corresponding shift fork shifts to establish a certain transmission gear ratio; means selectively engageable with a second end of each pivoting lever for pivotally moving the selected pivoting lever about the common axis; and further including a wear-resistant cap member mounted on said first end of each pivoting lever so as to be slidably movable relative to said first end to reduce friction therebetween, said cap member mounted on said first end being received in said recess of the corresponding shift fork extension so that said cap is slightly moveable relative to surfaces of said recess to reduce friction therebetween, said cap having an internal maximum diameter formed at one edge of the cap facing towards the pivot lever, said internal maximum diameter being slightly greater than the maximum diameter of said first end to enable loose coupling between the first end and cap.

* * * * *